United States Patent [19]

Marier

[11] Patent Number: 4,688,817
[45] Date of Patent: Aug. 25, 1987

[54] APPARATUS FOR ADJUSTING A VEHICLE STEERING MECHANISM

[75] Inventor: Gregory J. Marier, Brooklyn Park, Minn.

[73] Assignee: Yamaha Hatsudoki Kabushiki Kaisha, Iwata, Japan

[21] Appl. No.: 837,047

[22] Filed: Mar. 6, 1986

[51] Int. Cl.[4] ...................... B62K 21/16; B62K 21/24
[52] U.S. Cl. .................................... 280/278; 74/551.4; 74/551.7; 180/182; 280/279; 280/287; 403/93
[58] Field of Search ................ 180/182; 280/278, 287, 280/263, 270, 279; 403/92, 93, 56, 110, 374, 409.1; 74/551.1, 551.2, 551.3, 551.4, 551.5, 551.6, 551.7; 292/204, 207

[56] References Cited

U.S. PATENT DOCUMENTS

| | | | |
|---|---|---|---|
| 179,764 | 7/1876 | Briggs | 403/93 X |
| 511,479 | 12/1893 | Westbrook | 74/551.4 |
| 578,180 | 3/1897 | Wood | 74/551.4 |
| 660,576 | 10/1900 | Justen | 74/551.4 |
| 663,195 | 12/1900 | McGuire | 74/551.5 |
| 679,086 | 7/1901 | Luce | 74/551.4 |
| 689,217 | 12/1901 | Palmer | 74/551.3 |
| 1,068,158 | 7/1913 | Noack | 74/551.7 |
| 1,464,308 | 8/1923 | Copony et al. | 403/374 X |
| 1,595,557 | 8/1926 | Mamiya | 74/551.4 |
| 2,603,495 | 7/1952 | Hermanson | 403/374 X |
| 3,481,218 | 12/1969 | Yoshikawa | 74/551.3 |
| 3,487,689 | 1/1970 | Weiss et al. | 403/93 X |
| 3,530,738 | 9/1970 | Kerr | 74/551.3 |
| 3,863,521 | 2/1975 | Gatsos et al. | 74/551.4 |
| 4,023,436 | 5/1977 | Dodge | 74/551.3 |
| 4,361,057 | 11/1982 | Kochera | 74/551.4 |

FOREIGN PATENT DOCUMENTS

| | | | |
|---|---|---|---|
| 313303 | 12/1933 | Italy | 292/207 |
| 62639 | 11/1945 | Netherlands | 74/551.6 |
| 7578 | of 1892 | United Kingdom | 74/551.3 |
| 11280 | of 1900 | United Kingdom | 403/93 |

Primary Examiner—John J. Love
Assistant Examiner—Charles R. Watts
Attorney, Agent, or Firm—Orrin M. Haugen; Thomas J. Nikolai; Frederick W. Niebuhr

[57] ABSTRACT

Apparatus is disclosed for adjusting the steering column and handlebars of a snowmobile. The steering column has upper and lower sections, pivotable with respect to one another about a first lateral axis. A first pawl and cylinder, mounted respectively to the upper and lower sections, rigidly connect these sections when engaged, but permit these sections to pivot relative to each other when the pawl is retracted from the cylinder. A second pawl and cylinder are mounted at the top of the steering column upper section and rigidly connect the upper section and handlebars. Retraction of the second pawl from engagement with the second cylinder frees the handlebars for rotation, relative to the upper steering column section, about a second lateral axis parallel to the first axis. A single lever, pivotally mounted to the column upper section, has a cam which engages and retracts the first and second pawls simultaneously, for maximum ease in steering system adjustment.

16 Claims, 6 Drawing Figures

U.S. Patent   Aug. 25, 1987   Sheet 1 of 3   4,688,817
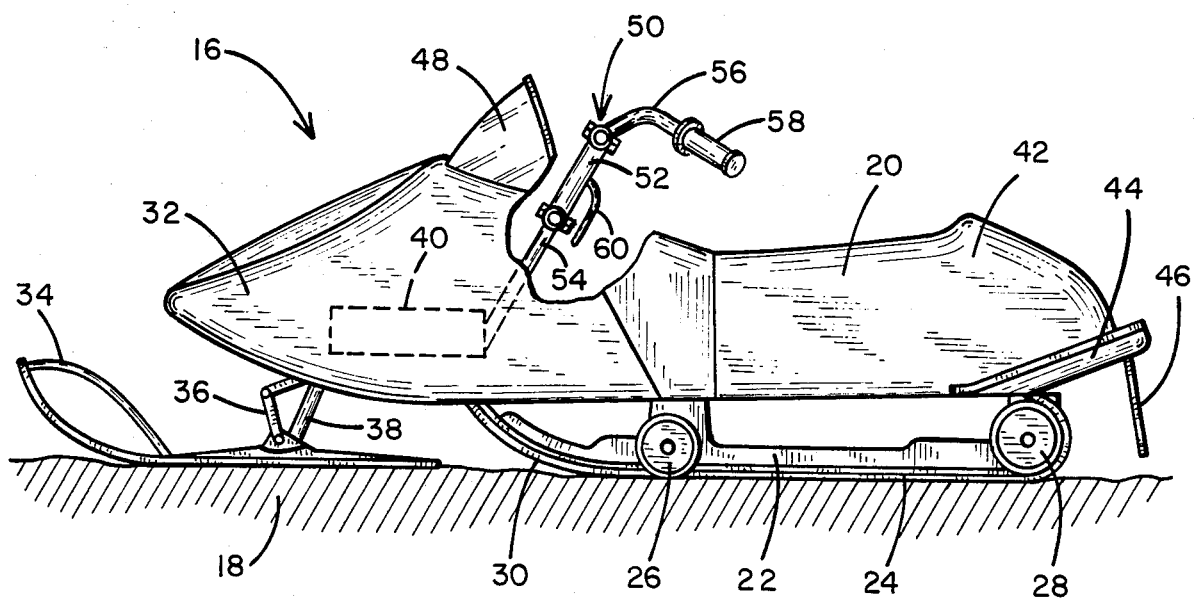
Fig. 1
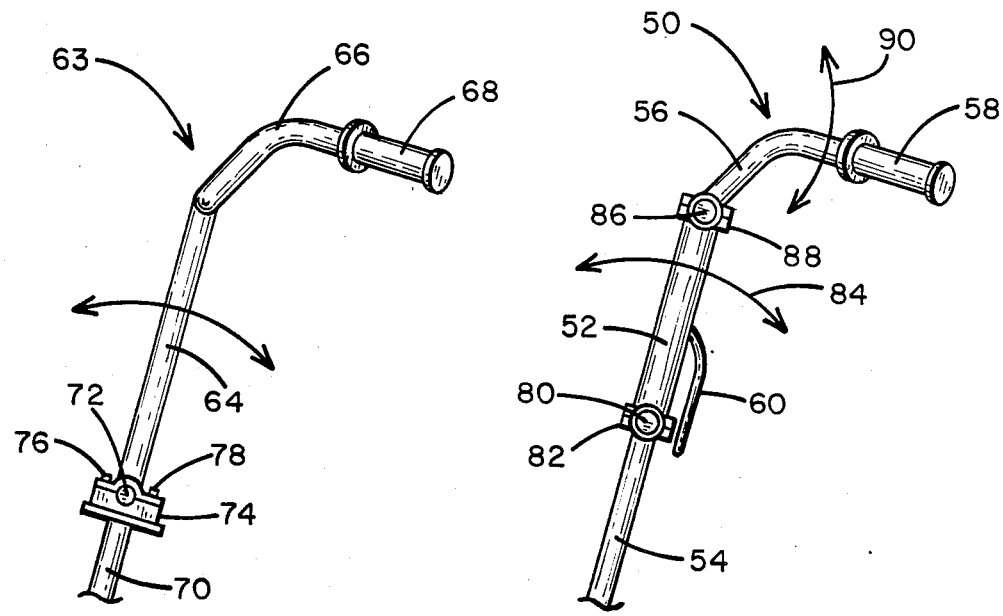
PRIOR ART
Fig. 2
Fig. 3

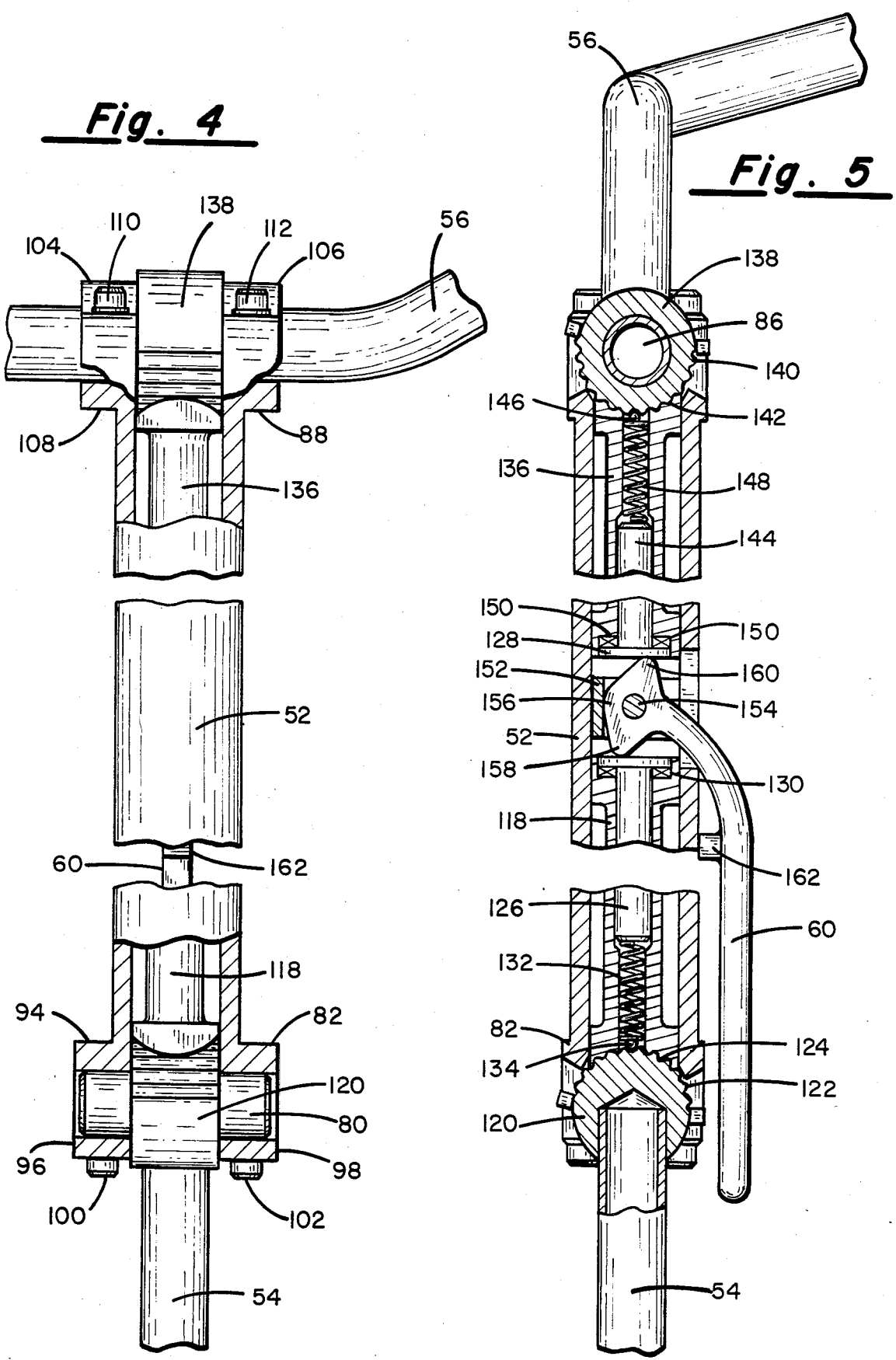

APPARATUS FOR ADJUSTING A VEHICLE STEERING MECHANISM

BACKGROUND OF THE INVENTION

Snowmobiles are well known as vehicles particularly well suited for travel over terrain covered by snow and ice. Typically, a snowmobile is propelled by a motor-driven endless belt, and guided directionally by a pair of steerable forwardly mounted skis. The skis are connected to a steering column through a steering linkage. The operator, by manipulating handlebars attached to the top of the steering column, determines the position of the skis to steer the snowmobile.

For maximum operator convenience and safety, it is desirable that the handlebars and steering column be adjustable over a range of heights with respect to the passenger seat in the snowmobile. One known method of providing such adjustment is to provide a steering column in two sections, pivotally mounted relative to each other at a lateral pivot axis along the steering column. A clamp, secured by bolts, maintains the two column sections substantially rigid with respect to each other after adjustment.

One disadvantage of this pivotal mounting, however, is that a pivot near the steering column base results in a substantial rearward displacement of the handlebars in order to lower them. On the other hand, if the pivot point is raised in order to reduce the horizontal component of the pivotal motion, the handlebars undergo substantial rotation about a horizontal axis as they are adjusted upward or downward. Consequently the handlebars are moved out of the desired orientation, in which gauges and controls mounted on the handlebars are optimally positioned for reading and handling. Yet another problem with this arrangement is the inconvenience of re-adjusting the steering column position. The bolts must be loosened, the adjustment made, and the bolts re-tightened.

The prior art, particularly in connection with bicycle handlebars, evidence attempts to enhance operation by adjustable handlebars. U.S. Pat. No. 689,217 to Palmer granted Dec. 17, 1981 shows bicycle handlebars 17 mounted to a stem 11 held by a clamp 10. Loosening of clamp 10 permits sliding of the stem and 180° rotation of it. U.S. Pat. No. 4,023,436 to Dodge granted May 17, 1977 shows in FIG. 31 a bicycle handle having at least three sections and two pivots. Bolts are loosened to permit the sections of the handlebar to pivot with respect to one another. U.S. Pat. No. 1,595,557 to Mamiya granted Aug. 10, 1926 discloses a folding bicycle handle in which separate handle sections are mounted to pivot relative to one another, but normally held against such pivoting by a spring 25 which urges pawls 24 against a toothed member 16.

While these prior art approaches provide some satisfaction, particularly in connection with bicycle handles, they fail to meet the need for a means for rapidly and conveniently adjusting a steering column, yet ruggedly and securely maintaining the column in its selected adjustment position, and further permitting vertical handlebar adjustment without undue horizontal movement or rotation of the handlebars out of their desired angular position.

Therefore, it is an object of the present invention to provide a means for adjusting handlebars to suit a variety of operators.

Another object of the invention is to provide a means for rapidly and conveniently changing the handlebar adjustment.

Another object is to provide for adjusting the height of handlebars, without undue forward or rearward movement of the handlebars, and without rotation of the handlebars out of their desired orientation.

Yet another object of the invention is to provide a means for securely maintaining the handlebar in its desired, adjusted position, thereby to provide a rugged, long-lasting structure.

SUMMARY OF THE INVENTION

To achieve these and other objects, there is provided an adjustable steering apparatus for vehicles. The apparatus includes an elongated first steering member, a second steering member, and a first connecting means for joining the second steering member with respect to one end of the first steering member, for pivoting relative to the first member about a first transverse axis. A third steering member is provided, along with a second connecting means for joining the third member with respect to the opposite end of the first steering member for pivoting relative to the first member about a second transverse axis. A first locking means substantially rigidly secures the first and second steering members against pivoting relative to each other when engaged, and permits such pivoting when the first locking means is disengaged. A second locking means substantially rigidly secures the first and third steering members against pivoting relative to one another when the second locking means is engaged, and permits such pivoting when the second locking means is disengaged. A control means is mounted with respect to the first member and is movable between a locking position and a release position. The control means disengages the first and second locking means as it is moved from its locking position toward its release position, and engages the first and second locking means as it is moved from the release position to the locking position.

Preferably, the first connecting means includes a transversely extended first pin integral with the second member, and a first sleeve integral with the first member, with the first pin rotatable in the first sleeve. Similarly, the second connecting means can include a transversely extended second pin integral with the third member, and a second sleeve integral with the first member, the second pin being rotatably contained within the second sleeve.

The first locking means preferably comprises a first cylinder integral with the second member, and a first pawl mounted with respect to the first member for movement toward and away from locking engagement with the first cylinder. The second locking means is preferably a second cylinder integral with the third member and a second pawl mounted with rspect to the first member for movement toward and away from locking engagement with the second cylinder. To ensure positive locking engagement, the first cylinder and pawl, and the second cylinder and pawl, can have complementary teeth. Further, the first and second pawls can be mounted to slide longitudinally within the first member, which can comprise a hollow steering column section.

The control means preferably comprise a cam rotatably secured to the first member. When the cam is rotated from the release position to the locking position, it urges the first and second pawls into locking engagement with their associated cylinder. When the cam is rotated from the locking to release position, it permits the pawls to disengage from the cylinders.

First and second coil springs can be mounted between the first pawl and cylinder, and second pawl and cylinder, respectively. Each spring urges its associated pawl away from the locking position. First and second contact members can be provided at the end of the springs near the associated cylinder. Each contact member preferably has a spherical surface facing its associated cylinder, and is urged against the cylinder between adjacent teeth by its associated coil spring. Rotation of the associated cylinder causes the contact member to ride over a tooth against the force of its associated coil spring, into the next adjacent space between teeth.

The linkage of three steering members at two pivot points about transverse axes permits vertical adjustment of the third member, which can comprise handlebars, while preserving a desired angular orientation. Also, this arrangement can permit handlebar height adjustment without undue forward or reverse horizontal movement of them. The cam adjusted pawls positively lock the steering mechanism when cammed into the locking position, yet permit rapid and easy adjustment of the steering mechanism when cammed into their release positions, wherein the respective coil springs and contact members provide the only resistance to pivotal movement. During adjustment, the contact members transverse over successive cylinder teeth, each time lodging into the next space between adjacent teeth. This gives the operator a definite "feel" for each successive adjustment position, and maintains the steering mechanism in that position as the cam is reset to lock both pawls.

IN THE DRAWINGS

The above and other features and advantages can be better understood from consideration of the detailed description in association with the following drawings, in which:

FIG. 1 is a schematic side view of a snowmobile, with portions of a side wall removed to illustrate a steering mechanism constructed in accordance with the present invention;

FIG. 2 is a side view of a steering mechanism of the prior art;

FIG. 3 is an enlarged side view of the steering mechanism in FIG. 1;

FIG. 4 is a further enlarged frontal view of the steering mechanism of FIG. 3, with portions of the steering column either wall removed for clarity in illustration;

FIG. 5 is a side view of the steering mechanism in FIG. 4, showing locking assemblies of the steering mechanism in an engaged position.

DETAILED DESCRIPTION OF THE PREFERRED EMBODIMENT

Figure 6:
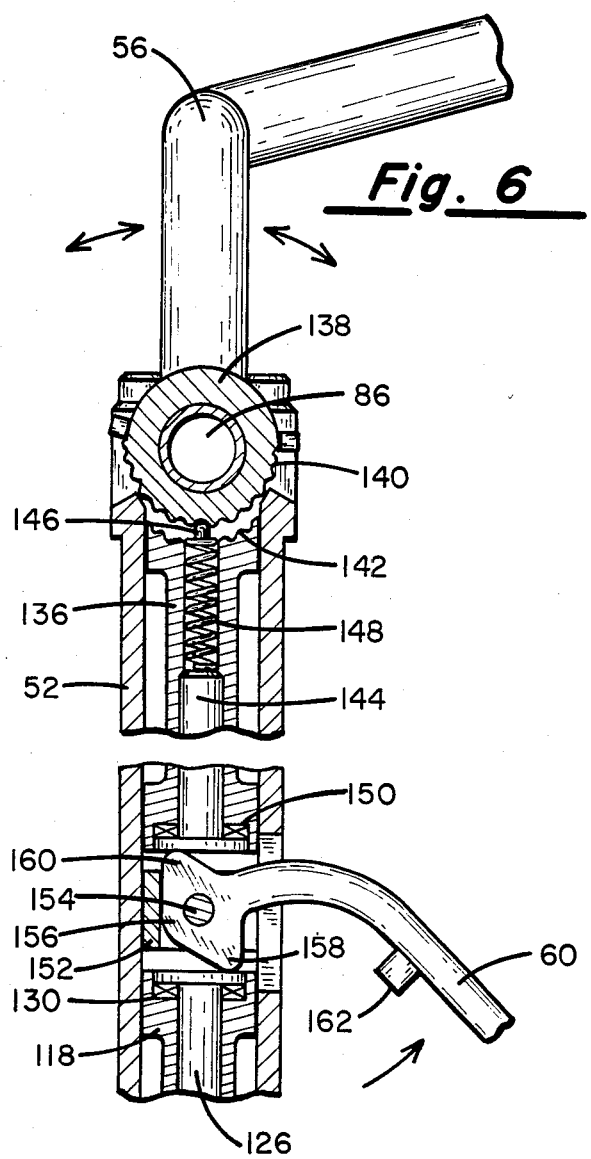
FIG. 6 is a view similar to FIG. 5, but showing the locking assemblies disengaged.

Turning now to the drawings, there is shown in FIG. 1 a snowmobile 16, a vehicle particulary well adapted for traversing a surface 18 of snow and ice covered ground. Snowmobile 16 includes a body 20 and a drive assembly for supporting the body on surface 18. The drive assembly includes a frame 22 to which is mounted a guide rail 24 and idler sprockets 26 and 28. An endless belt or track 30 is mounted on the idler sprockets and guide rail, and further to a motor driven sprocket, not shown. In response to the motor driven sprocket, belt 30 rotates counterclockwise as viewed in the figure, digging into the snow to propel snowmobile 16 forward.

Also supporting snowmobile 16, near a tapered forward end 32 of the snowmobile, are two steerable skis, one of which is illustrated at 34. A hinge 36 and strut 38 support ski 34 with respect to body 20, and the other ski of the pair is similarly supported. Both skis are steeringly engaged to a steering linkage shown in phantom at 40.

At a rearward end 42 of the snowmobile is mounted a guard 44 from which is suspended a flap 46. The flap protects the snowmobile driver and any passengers from loose snow and ice kicked upwardly by belt 30 as it moves the snowmobile. To enhance driver vision and safety, a windshield 48 is mounted to body 20 near the tapered forward end.

A portion of body 20 has been cut away to more clearly reveal a steering mechanism 50 attached to the steering linkage. Mechanism 50 includes a first steering member or steering column section 52, and a second steering member comprising a lower steering column section 54, connected to the steerable skis through steering linkage 40. A third steering member of the steering mechanism comprises handlebars 56, on which are mounted handle grips, one of which is shown at 58. Pivotally mounted to upper section 52 is a quick release leverl 60, the purpose of which shall be later explained.

The snowmobile driver, seated behind steering mechanism 50, manipulates handlebars 56 in order to selectively position the steerable skis, thereby to steer the moving snowmobile, Inevitably, persons operating snowmobiles such as snowmobile 16 have different individual trunk heights and arm lengths. For comfort and safety, it is desirable to provide a steering mechanism that adjusts to suit the individual driver. Indeed, an individual driver may wish to vary the setting from time-totime. One prior art steering mechanism 62 is shown in FIG. 2. Steering mechanism 62 includes a main steering column section 64 to which handlebars 66 and handle grips (one at 68) are rigidly attached. Main section 64 is pivotally attached to a bottom steering column section 70 through a laterally extended post 72 that rotates within a clamp 74. Bolts 76 and 78 tighten clamp 74 about post 72 to prevent rotation, thus to secure column sections 64 and 70 substantially rigidly relative to each other. In order to adjust the steering mechanism, bolts 76 and 78 are loosened, then re-tightened following adjustment to the desired handlebar position.

A problem with the pin and bolt assembly is that it is inconvenient to adjust. An operator is likely to accept a less than desirable steering column position, just to avoid the difficulty of resetting the steering column and bringing along extra tools to do so. Also, the handlebars and handle grip rotate with main section 64 as it pivots, thus rotating the handlebar and grips out of their optimum angular orientation. Also, due to the length of steering column section 64 and the locations of the pivot point, handlebars 66 must travel a substantial forward or reverse distance to achieve height adjustment.

Steering mechanism 50, shown alone in FIG. 3, addresses the shortcomings of the prior art steering mechanism. Upper steering column section 52 is connected to lower steering column section 54 through a first connecting means including a transversely extended first pin 80 integral with lower column section 54, and a first clamp 82 integral with column section 52. Clamp 82 defines a sleeve in which pin 80 can rotate. Consequently, upper column section 52 can pivot with respect to the lower column section about a first transverse axis, thus moving as indicated by a first bi-directional arrow at 84.

Similarly, handlebars 56 are connected pivotally to steering column section 52 at a second connecting means including a second pin 86 which in fact is part of the handlebars, and a second clamp 88 integral with the upper steering column section. Handlebars 56 thus pivot as illustrated by a second bi-directional arrow 90, about a laterally extended second axis.

FIGS. 4 and 5 illustrate the first and second connecting means in greater detail. A portion of the lower end of upper column section 52 has been removed to reveal that first clamp 82 includes first upper clamp section 94 which is part of steering column section 52, and two opposed first lower clamp sections 96 and 98, one on each side of the main column section. Lower clamping section 96 is fastened to upper clamp section 94 by two bolts, one of which is shown at 100. Likewise, lower clamp section 98 is fastened to the upper clamp section by two bolts, one of which is shown at 102. Bolt 100 and 102 are located behind pin 80 as viewed in FIG. 4, the additional bolts in each case located in front of the pin.

Portions of the top end of steering column section 52, when removed, show second clamp 88 to include second upper clamp sections 104 and 106, and a single second lower clamp section 108 formed as part of steering column section 52. A pair of bolts fastens each of upper clamp sections 104 and 106 to lower clamp section 108 in the fashion explained in connection with first clamp 82. Two of the four bolts are shown at 110 and 112. Clamp sections 104, 106 and 108, when fastened together, define the upper sleeve in which handlebars 56 rotate.

In FIG. 5, that part of the upper steering column section wall on the left side is removed to illustrate a first locking assembly for rigidly securing steering column sections 52 and 54 with respect to each other, and a second locking means for similarly securing column section 52 and handlebars 56. The first locking means includes a first pawl 118 and a first cylinder 120. Formed in the upwardly facing portion of cylinder 120 are a series of substantially identical first cylinder teeth, one of which is indicated at 122. A series of complementary first pawl teeth are formed in the arcuate lower end of pawl 118. One of these teeth is indicated at 124. It is engagement of pawl 118 and cylinder 120 which locks steering column sections 52 and 54 against pivotal movement relative to one another. Bolts 100 and 102, and the additional two bolts not shown, merely secure clamping sections 94, 96 and 98 together to define the sleeve in which pin 80 rotates.

Formed in pawl 118 is a longitudinal cylindrical opening, in which is contained a rigid first cylindrical member or bar 126. Bar 126 has an enlarged top 128 which forms a cam following surface. Top 128 and a first flexible washer assembly 130 are contained in a recess in the pawl. The washer assembly acts as a retention means to keep bar 126 and pawl 118 from slipping out of the locking position.

Also contained in the longitudinal cylindrical opening, directly below bar 126, is a first coil spring 132. Spring 132 is held in compression between the lower end of bar 126 and a first contact member plunger 134. The downwardly facing portion of plunger 134 is hemispherical or ball-shaped, permitting it to seat itself between adjacent teeth 122 of cylinder 120 in response to the force of coil spring 132.

The second locking assembly is comprised of a second pawl 136 and a second cylinder 138. The downwardly facing portion of cylinder 138 is provided with series of second cylinder teeth, one of which is indicated at 140. Complementary second pawl teeth, one indicated at 142, are formed in the arcuate top of second pawl 136.

A longitudinal, cylindrical opening is formed centrally of second pawl 136, in which is housed a second cylindrical member or bar 146, a second contact member or plunger 146, and a second coil spring 148 under compression between the upper end of bar 144 and second plunger 148. A recess in pawl 136 contains an expanded lower portion/cam following surface of bar 144, and a second flexible washer assembly 150. All of these parts are substantially identical in structure and function to the corresponding parts identified in connection with the first locking assembly. Washer assemblies 130 and 150 maintain both locking assemblies in their locking position, in that they permit cam overtravel as later explained. A pad 152 is provided as a spacer between lever 60 and the steering column.

As seen in FIG. 5, quick release lever 60 is pivotally mounted to upper steering column section 52 at a shaft 154. That portion of the lever immediately surrounding shaft 154 is formed into a cam 156. Cam 156 includes two substantially identical cam extensions 158 and 160, symmetrical about shaft 154, each cooperating with a respective one of bars 126 and 144 in order to lock and release the respective pawls and cylinders. A projection 162 extending from the handle portion of lever 60 contacts the outside wall of upper steering column section 52 when the lever is locked, to protect the hand of the operator when moving the lever into the locked position.

Lever 60 is pivotable with respect to column section 52 between a locking position as shown in FIG. 5, and a release position shown in FIG. 6. In the locking position, the maximum width of cam 156 is substantially vertical, but tilted slightly clockwise of the vertical position. With cam extension 158 working against first bar 126, and cam extension 160 simultaneously working against second bar 144, the bars are urged apart from one another against the force of their associated coil springs 132 and 148, thus urging first and second pawls 118 and 136 into locking engagement with first and second cylinders 120 and 138, respectively.

Due to the slight clockwise tilt or over-travel in cam 156, the force of springs 132 and 148 and washer assemblies 130 and 150 tends to maintain lever 60 in its locking position, as does the force of pad 152, which cooperates with the washers and coil springs to resist any tendency of the lever to be kicked out of the locking position in the event of momentary shock transferred through the steering column.

In FIG. 6, lever 60 has been rotated counterclockwise to assume its release position. With the maximum width portion of cam 156 slanted substantially counterclockwise from the vertical, bars 126 and 144, along with their associated pawls, are permitted to travel closer to one another under the influence of coil springs 132 and 148. While plungers 134 and 146 remain seated against cylinders 120 and 138, respectively, pawls 118 and 136 are completely withdrawn, i.e. disengaged, from their associated gears. Once moved to the release position, lever 60 is kept there by virtue of coil springs 132 and 148, and the washer assemblies 130 and 150, acting through their associated bars against cam 156. Thus, because the cam position where it separates bars 126 and 144 the maximum amount lies between the locking and release positions, over-travel is achieved for both settings.

With lever 60 released, upper column section 52 is free to rotate relative to lower column section 54, and handlebars 56 are free to rotate with respect to the upper steering column section. However, the rotation is not entirely free, due to plungers 134 and 146, which resist relative rotation sufficiently so that the steering column sections and handlebars pivot only in response to operator manipulation.

For example, first plunger 134 remains seated between adjacent teeth 122 of cylinder 120 to prevent its rotation with respect to pawl 118. However, an operator can readily overcome the slight resistance of plunger 134 simply by pivoting upper steering column section 52 in the direction desired. In response to such pivoting, plunger 134 rides upwardly against one of adjacent teeth 122, eventually riding over the top of the tooth and seating itself into the next adjacent spacing between teeth. This seating action causes a brief and slight vibration in steering mechanism 50, transmitting to the operator the "feel" of an adjustment having been made. The operator continues to pivot the main column section, moving plunger 134 into and out of successive spaces between adjacent teeth, until the desired upper steering column section position is reached.

In similar fashion, the operator causes second plunger 146 to traverse teeth 140 in succession until the desired location of handlebars 56 is achieved. Because of the holding action of plunger 134 against first cylinder 120, handlebar adjustment can be made without disturbing the pivot position of upper steering column section 52 with respect to lower steering column section 54. Alternatively, the adjustments to column section 52 and handlebars 56 may be made simultaneously, particularly as the operator becomes more familiar with the adjustment mechanism. The plungers provide a light hold, enabling the operator to conveniently test a variety of column and handlebar settings. Preferably the plunger diameter exceeds the spacing between associated cylinder teeth, to enhance the ability to travel among the teeth.

Following adjustment of handlebars 56 and column section 52, the operator simply moves lever 60 back to its locking position, thereby simultaneously urging pawls 118 and 136 against their associated cylinders to secure the entire steering mechanism. Plungers 134 and 146, by seating themselves into the selective spaces between adjacent teeth of their associated cylinders, pre-align each cylinder and associated pawl. Consequently, lever 60 can be locked rapidly without fear that the pawl teeth and cylinder teeth are misaligned. This prevents wear or damage to the cylinder and pawl teeth from engagement when misaligned.

Thus, by the simple manipulation of a single lever, the operator is able to adjust the snowmobile steering column to the desired handlebar height and angular orientation. Handlebar orientation is particularly important when considering the placement of instruments and controls such as hand brakes on the handlebars. Gauges must be positioned where they are conveniently readable while the operator devotes principal attention to steering the snowmobile.

In addition to the convenient, simultaneous adjustment over two pivot axes, the present invention provides, through the plungers, a stable configuration of the steering mechanism even with the locking lever released, thus to assist the operator in adjusting the steering mechanism to the optimum position.

What is claimed is:

1. An adjustable steering apparatus for vehicles, including:
   an elongated first steering member.
   a second steering member and a first connecting means for joining said second steering member with respect to one end of said first steering member for pivoting relative to the first steering member about a first transverse axis, said first connecting means comprising a first pin integral with said second steering member, and extended in the direction of said first transverse axis, and means forming a first sleeve integral with said first steering member, said first pin rotatable in the first sleeve;
   a third steering member, and a second connecting means for joining said third steering member with respect to the opposite end of said first steering member for pivoting relative to the first steering member about a second transverse axis, said second connecting means comprising a second pin integral with said third steering member and extended in the direction of said second transverse axis, and means forming a second sleeve integral with said first steering member, said second pin rotatable in the second sleeve;
   a first locking means comprising a first cylinder integral with said second steering member, and a first pawl mounted with respect to said first steering member for movement toward and away from locking engagement with said first cylinder, for substantially rigidly securing said first and second steering members against pivoting relative to one another when said first cylinder and first panel are in locking engagement, and for permitting such pivoting when they disengage;
   a second locking means comprising a second cylinder integral with said third steering member and a second pawl mounted with respect to said first steering member for movement toward and away from locking engagement with the second cylinder, for substantially rigidly securing said first and third steering members against pivoting relative to one another when said second cylinder and second pawl are in locking engagement, and for permitting such pivoting when they are disengaged; and
   a cam rotatably mounted with respect to said first member and between said pawls, and movable between a locking position and a release position, and biasing means for urging each of said first and second pawls away from its locking engagement and toward said cam; said cam allowing said pawls to more responsive to their respective biasing means to simultaneously disengage said first locking means and said second locking means as the cam is moved from said locking position toward said release position, and moving said pawls against the force of their respective biasing means to simultaneously engage said first locking means and said second locking means as the cam is moved from said release position toward said locking position.

2. The steering apparatus of claim 1 including a series of teeth formed in each of said first and second cylinders, and a series of complementary teeth formed in each of said first and second pawls, for effecting locking engagement between each cylinder and its associated pawl.

3. The steering apparatus of claim 2 wherein:
said first steering member comprises a hollow steering column section, said pawls contained inside said column section and movable longitudinally with respect thereto, and wherein said cam is mounted inside said column section.

4. The steering apparatus of claim 3 wherein said cam is mounted proximate the center of said steering column section, with said first and second pawls on opposite sides of the cam.

5. The steering apparatus of claim 4 wherein said respective biasing means include a first coil spring in compression between said first pawl and said first cylinder, and a second coil spring in compression between said second pawl and said second cylinder.

6. The steering apparatus of claim 5 further including a first contact member between said first spring and said first cylinder and a second contact member between said second spring and said second cylinder, each of said contact members having a generally hemispherical surface facing its associated cylinder.

7. The steering apparatus of claim 6 wherein the diameter of each said hemispherical surface of said contact member is larger than the spacing between adjacent teeth of said associated cylinder.

8. The steering apparatus of claim 7 including means defining a cylindrical longitudinal opening in said first pawl, and a bar mounted in said opening and having a camming surface in contact with said cam.

9. The steering apparatus of claim 8 including a flexible washer assembly positioned between said bar and said first pawl.

10. The steering apparatus of claim 9 wherein the cam position at which said cam displaces said cylindrical member and first pawl a maximum amount against the force of said coil spring and washer assembly, is between said locking position and said release position.

11. The sterring apparatus of claim 1 wherein said first steering member includes an upper steering column section, said second steering member includes a lower steering column section, and said third steering member includes handlebars.

12. The steering apparatus of claim 1 wherein said first and second transverse axes are parallel.

13. An apparatus for releasably and substantially rigidly engaging two pivotally connected members, comprising:
a first member;
a second member, and a connecting means for joining said second member with respect to said first member for pivoting relative to the first member;
a locking means for substantially rigidly securing said first and second members against pivoting relative to each other when engaged, and for permitting such pivoting when disengaged, said locking means including a cylinder integral with the second member and a pawl means mounted with respect to the first member for movement toward and away from locking engagement with the cylinder;
a cam rotatably mounted with respect to the first member, positioned against said pawl means, and movable between a locking position and a release position, and a coil spring contained under compression between said pawl means and said cylinder, said cam disengaging the pawl means and cylinder as the cam is moved from the locking position toward the release position, and moving the pawl means against the force of said spring to engage the pawl and cylinder when the cam is moved from the release position to the locking position, and a contact member between said spring and said cylinder, said contact member having a generally hemispherical surface facing said cylinder and continually urged against said cylinder by said coil spring; and
means defining a cylindrical opening in said pawl means, said pawl means including a bar mounted in said opening and having a cam following surface in contact with said cam.

14. The apparatus of claim 13 further including a washer assembly positioned between said bar and a portion of said pawl means surrounding said bar.

15. The apparatus of claim 13 including a series of teeh formed in said cylinder, and a series of complementary teeth formed in said pawl means, for effecting locking engagement between the cylinder and pawl.

16. The apparatus of claim 15 wherein:
the diameter of said contact member is larger than the spacing between adjacent teeth of said cylinder.

* * * * *